(12) United States Patent
Ai

(10) Patent No.: US 6,689,008 B2
(45) Date of Patent: Feb. 10, 2004

(54) PLANETARY TRACTION DRIVE TRANSMISSION

(75) Inventor: Xiaolan Ai, Stark County, OH (US)

(73) Assignee: The Timken Company, Canton, OH (US)

( * ) Notice: Subject to any disclaimer, the term of this patent is extended or adjusted under 35 U.S.C. 154(b) by 0 days.

(21) Appl. No.: 10/047,291

(22) Filed: Jan. 14, 2002

(65) Prior Publication Data

US 2003/0134709 A1 Jul. 17, 2003

(51) Int. Cl.⁷ .......................... F16H 15/48; F16H 13/14
(52) U.S. Cl. ................. 475/193; 475/194; 475/195
(58) Field of Search ..................... 475/183, 193, 475/190, 191, 197, 194, 195, 348

(56) References Cited

U.S. PATENT DOCUMENTS

| | | | |
|---|---|---|---|
| 1,060,073 A | * 4/1913 | Fono | 475/197 |
| 1,624,097 A | * 4/1927 | Gensmer | 475/186 |
| 1,642,346 A | * 9/1927 | Uytjens | 475/187 |
| 2,089,048 A | 8/1937 | Bachman | |
| 2,221,514 A | 11/1940 | Foley | |
| 2,800,030 A | 7/1957 | Werner | |
| 3,048,058 A | * 8/1962 | Chery | 475/197 |
| 3,207,004 A | * 9/1965 | Chery | 475/197 |
| 3,224,300 A | 12/1965 | Chery | |
| 3,375,739 A | 4/1968 | Nasvytis | |
| 3,490,311 A | 1/1970 | Okabe | |
| 4,747,324 A | 5/1988 | Perry | |
| 4,802,386 A | 2/1989 | Haack | |
| 4,846,008 A | 7/1989 | Kraus | |
| 5,021,035 A | 6/1991 | Zhou | |
| 5,025,671 A | 6/1991 | Kraus | |
| 5,688,201 A | 11/1997 | Zhou | |
| 6,095,940 A | 8/2000 | Ai et al. | |
| 6,238,095 B1 | 5/2001 | Ai | |
| 6,406,399 B1 | * 6/2002 | Ai | 475/183 |

FOREIGN PATENT DOCUMENTS

| | | |
|---|---|---|
| AT | 212658 | 5/1960 |
| DE | 496772 | 4/1930 |
| GB | 8377 | 4/1898 |
| JP | 10860 | 1/1979 |
| JP | 39763 | 3/1979 |
| SU | 1073515 | 2/1984 |
| SU | 1702018 | 12/1991 |

* cited by examiner

Primary Examiner—Tisha D. Lewis
(74) Attorney, Agent, or Firm—Polster, Lieder, Woodruff & Lucchesi, L.C.

(57) ABSTRACT

A traction drive transmission is organized about a center axis and includes a sun roller having first and second inner raceways. The raceways are tapered such that their large ends are presented toward each other. There is provided a first plurality of planet rollers arranged in a row between a first inner raceway and a first outer raceway. The first plurality of rollers have a first tapered side face that contacts the first inner raceway and a second tapered side face that contacts the first outer raceway. A second plurality of planet rollers is arranged in a row between the second inner raceway and the second outer raceway and has a first tapered side face that contacts the second inner raceway and a second tapered side face that contacts the second outer raceway.

21 Claims, 5 Drawing Sheets

PLANETARY TRACTION DRIVE TRANSMISSION

BACKGROUND OF THE INVENTION

This invention relates in general to transmissions and, more particularly, to a planetary traction drive transmission having, at critical surfaces, pure rolling contact which is characterized by the absence of spinning.

Planetary transmissions typically rely on meshing gears to transfer power—indeed, several planet gears between a sun gear and a ring gear. This arrangement distributes the load through the several planet gears, enabling the system to accommodate higher loads, and further provides several speed ratios, depending on where power is supplied to the system and where it is delivered from the system. But gear systems inherently contain backlash, are somewhat noisy, and set up vibrations. Moreover, the meshing gear teeth slide across each other, and the friction generated detracts from the efficiency of the system.

Planetary friction or traction drives, which rely solely on friction between rotating components to transfer power, do not have backlash and further operate with less noise and less vibration than planetary gear systems, and in that sense they are superior to planetary gear systems. Furthermore, they have the capacity to operate at high velocity and with high efficiency. Even so, many planetary systems of current design experience slipping in the form of spinning at critical surfaces where torque is transmitted, or to minimize this they may rely on narrow regions of contact where loads are heavily concentrated.

Actually, two types of slippage may exist along a line of contact between two critical surfaces in a traction drive transmission. One is characterized by pure sliding in which the difference in velocity between the two surfaces at the line of contact remains the same along the entire line of contact. Lubrication will accommodate this type of slippage, and indeed this type of slippage inherently exists when lubrication is present. Insofar as this discussion is concerned, this type of slippage constitutes pure rolling contact. The other type of slippage is characterized by spinning along the line of contact. Here the difference in velocity between the two critical surfaces varies along the line of contact. It may be in the same direction, in which case the pivot point is at or beyond the end of the line contact, or it may be in two directions, in which event the pivot point is between the ends of the line of contact.

Spinning wastes energy and produces heat that may diminish the effectiveness of lubricants in the transmission. It also promotes wear, which affects the reliability of the transmission, and likewise limits the torque transmitted by it. When narrow regions of contact are used to minimize spin-induced slippage, the concentration of loads so produced may cause early failure of the metal in the regions where the loads are concentrated and further reduces the capacity of the transmission to transmit torque.

Moreover, traction drives of current design cannot achieve high-speed ratios without being excessively large. Thus, they are not suited for use in confined spaces when high-speed ratios and equivalent torque ratios are required.

SUMMARY OF THE INVENTION

In its broadest aspect, the present invention provides a traction drive transmission organized about a center axis and includes a sun roller having first and second inner raceways. The raceways are tapered such that their large ends are presented toward each other. There are also provided first and second outer raceways tapered such that their large ends are presented toward each other. The first outer raceway is located around the first inner raceway and the second outer raceway is located around the second inner raceway. Next, there is provided a first plurality of planet rollers arranged in a row between the first inner raceway and the first outer raceway. The first plurality of rollers have a first tapered side face that contacts the first inner raceway and a second tapered side face that contacts the first outer raceway. A second plurality of planet rollers is arranged in a row between the second inner raceway and the second outer raceway and has a first tapered side face that contacts the second inner raceway and a second tapered side face that contacts the second outer raceway. The first and second planet rollers are arranged in pairs, with the first planet roller of any pair backing and serving to axially position the second planet roller of the pair. Finally, there is provided a carrier connected to the first and second planet rollers.

DETAILED DESCRIPTION OF THE PREFERRED EMBODIMENT

Figure 1:
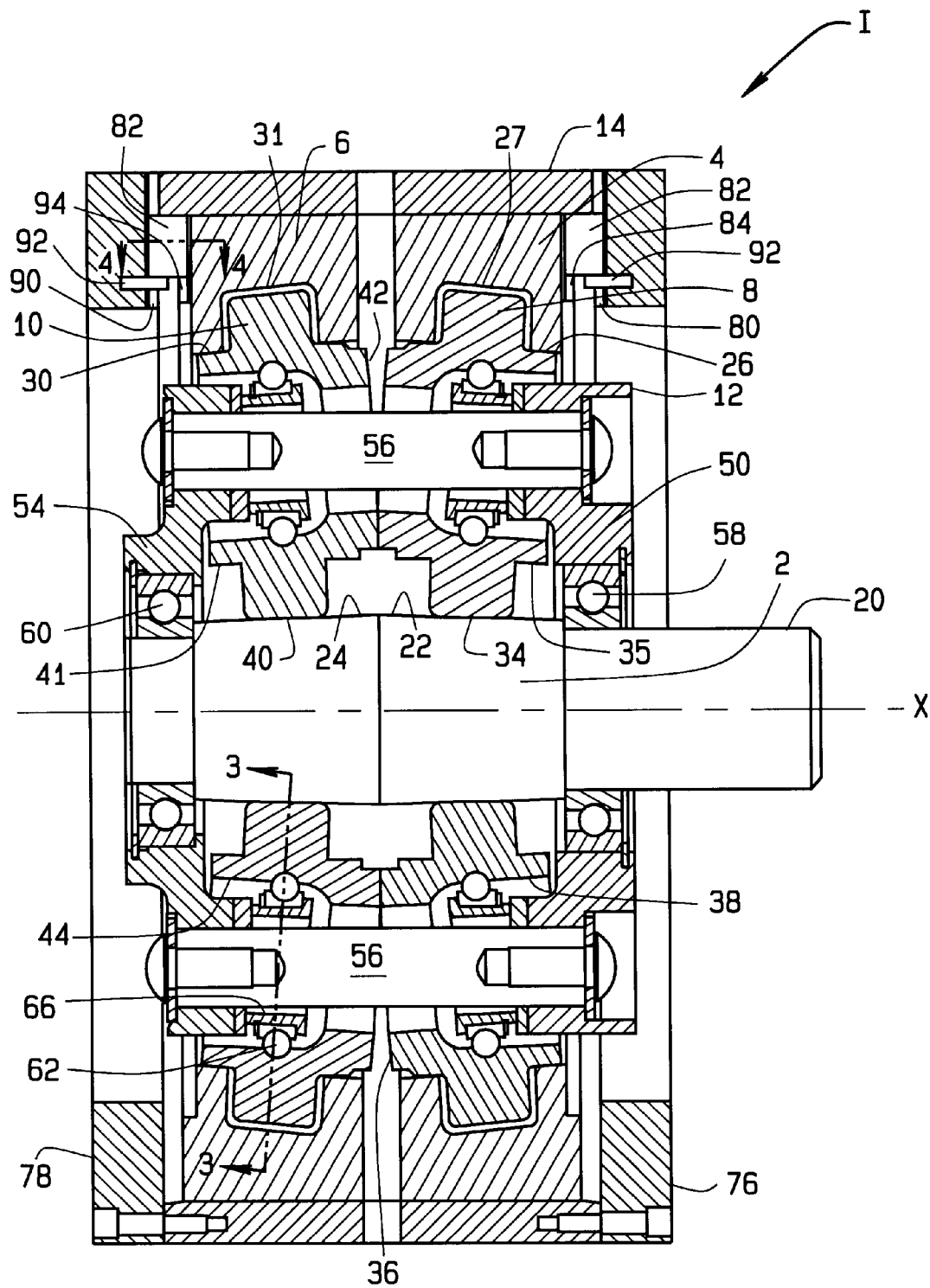
FIG. 1 is a longitudinal sectional view of a transmission according to an embodiment of the present invention.

Referring to FIG. 1, a planetary traction drive transmission I operates with essentially no spinning along contacting surfaces at which power is transferred through the transmission. When configured properly, the transmission I will transfer power at medium-speed ratios and at correspondingly medium torque ratios. The transmission I is organized about a center axis X and comprises a sun roller 2, a pair of outer rings 4, 6 located around the sun roller 2, yet spaced from the sun roller 2 and planetary rollers 8, 10 occupying the annular spaces between the sun roller 2 and the outer rings 4, 6. Actually, the rollers 8 are organized in one circular row that is within the outer ring 4, and the rollers 10 are organized in another circular row that is within the outer ring 6. Moreover, the rollers 8 and 10 are arranged in pairs, there being for each roller 8 a corresponding roller 10 that is generally aligned with it. In addition, the transmission I has a planet carrier 12 coupled to the planetary rollers 8 and 10 and serving to maintain the rollers 8 and 10 of each pair in alignment. Also, the transmission I has a housing 14 that encloses the outer rings 4, 6, the rollers 8, 10, the sun roller 2 and the planet carrier 12.

Figure 2:
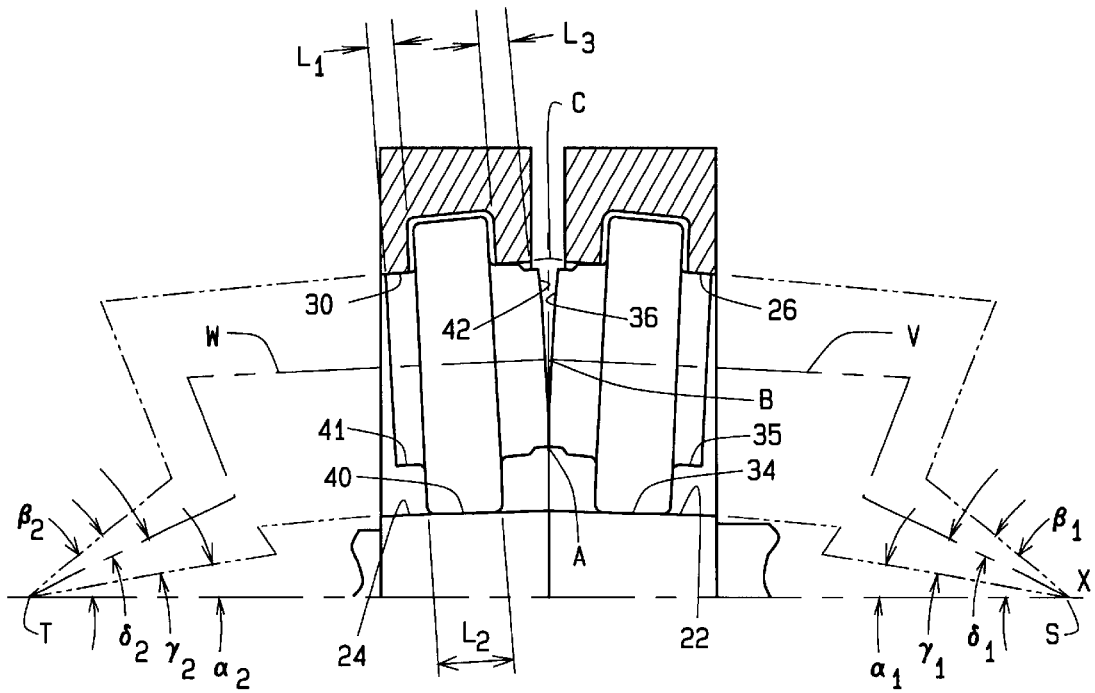
FIG. 2 is a sectional view of the transmission schematically showing the envelopes in which the raceways lie.

The sun roller 2 is mounted on a center shaft 20, the axis of which coincides with the axis X. It has two tapered raceways 22 and 24, the former of which is inclined at an angle $\alpha_1$ (FIG. 2), with respect to the axis X and the latter at an angle $\alpha_2$. The envelopes formed by the two raceways 22 and 24 are conical and intersect at a circle A, which for purposes of discussion should be considered a point A. The envelopes for the raceways 22 and 24 have their apices along the axis X at points S and T, respectively.

The outer rings 4, 6 do not undergo significant rotational or axial displacement relative to the housing 14. The outer rings 4, 6 have tapered raceways 26, 30 that are presented inwardly toward the raceways 22, 24 on the sun roller 2, and reliefs 27, 31 divide the tapered raceways 26, 30. The tapered raceway 26 lies within a conical envelope having its apex along the axis X at the point S. It assumes an angle $\beta_1$ (FIG. 2), with respect to the axis X. Due to the tapered raceway 26, the outer ring 4 has a large end and a small end. The tapered raceway 30 lies within a conical envelope having its apex along the axis X at the point T. It assumes an angle $\beta_2$ (FIG. 2), with respect to the axis X. Due to the tapered raceway 30, the outer ring 6 has a large end and a small end. The envelopes formed by the two raceways 26, 30 intersect at a circle C, which for the purposes of discussion should be considered a point C as seen in the sectional view.

The planetary rollers 8 occupy the annular space between the raceway 22 on the sun roller 2 and the raceway 26 on the outer ring 4 (FIG. 1). The rollers 8 also extend into the relief 27. Each roller 8 has a first tapered side face 34 along which the roller 8 contacts the raceway 22 of the sun 2, and a second tapered side face 35 along which the roller 8 contacts the raceway 26 of the outer ring 4. The contact between the side face 34 and the raceway 22 and the side face 35 and the raceway 26 is essentially a line contact. Thus, the side face 34 lies in a conical envelope having its apex at the point S (FIG. 2) and a half-conical angle of $\gamma_1$. The side face 35 also lies in a conical envelope having its apex at the point S and a half-conical angle of $\delta_1$. Each roller 8 revolves about its own axis V that intersects the main axis X at an angle ($\alpha_1+\gamma_1$), there in general exists the following mathematical constraint:

$$\gamma_1 \geq \tfrac{1}{2}(\beta_1-\alpha_1) \text{ and}$$

$$\delta_1 \leq \tfrac{1}{2}(\beta_1-\alpha_1).$$

In addition to its side faces 34, 35, each planetary roller 8 has a beveled end face 36 that is presented toward its corresponding roller 10 in the other row. Finally, each roller 8 contains an internal cavity 38 that passes completely through the roller 8, opening out of each of its ends.

The planetary rollers 10 occupy the annular space between the raceway 24 on the sun roller 2 and the raceway 30 on the outer ring 6 (FIG. 1). The rollers 10 also extend into the relief 31. Each roller 10 has a first tapered side face 40 along which the roller 10 contacts the raceway 24 of the sun 2, and a second tapered side face 41 along which the roller 10 contacts the raceway 30 of the outer ring 6. The contact between the first tapered side face 40 and the raceway 24 and the second side face 41 and the raceway 30 is essentially a line contact. Thus, the side face 40 lies within a conical envelope having its apex at the point T (FIG. 2) along the main axis X and a half-conical angle $\gamma_2$. The side face 41 also lies in a conical envelope having its apex at the point T and a haft-conical angle $\delta_2$. Each roller 10 revolves about its own axis W that intersects the main axis X at an angle ($\alpha_2+\gamma_2$). In general, the following mathematical constraint holds true:

$$\gamma_2 \geq \tfrac{1}{2}(\beta_2-\alpha_2) \text{ and}$$

$$\delta_2 \leq \tfrac{1}{2}(\beta_2-\alpha_2).$$

In addition to its side faces 40, 41, each planetary roller 10 has a beveled end face 42 that is presented toward its corresponding roller 8 in the other row. Finally, each roller 10 contains an internal cavity 44 that passes completely through the roller 10, opening out of each of its ends.

Within each pair of rollers 8, 10, the axes V and W of those rollers 8, 10 intersect at a point B. The rollers 8, 10 of any pair contact each other along their respective beveled end faces 36, 42. Actually, line contact exists between the pair of rollers 8, 10 at their end faces 36, 42, and the line of contact passes through the points A, B, and C.

Due to the taper of the raceways 22, 26, the rollers 8 seek to move up those raceways 22, 26. Similarly, the rollers 10 seek to move up the raceways 24, 30. However, for each roller 8 between the raceways 22, 26 there exists a corresponding roller 10 between the raceways 24, 30. Thus, the rollers 10 maintain the axial position of the rollers 8 between the raceways 22, 26, and the rollers 8 maintain the axial position of the rollers 10 between the raceways 24, 30. Within any pair, the roller 10 backs the roller 8 and vice versa.

The planet carrier 12 includes a first end disk 50 located beyond the planet rollers 8 and a second end disk 54 located beyond the planet rollers 10. The carrier 12 has tie rods 56 which extend between the end disk 50 and the end disk 54. The end disk 50 fits around the center shaft 20 with rotation between the two being accommodated by a ball bearing 58. The end disk 54 is fitted to the end of the center shaft 20 with another ball bearing 60. The bearings 58, 60 prevent radial displacement of the carrier 12; yet enable it to rotate about the axis X.

Figure 3:
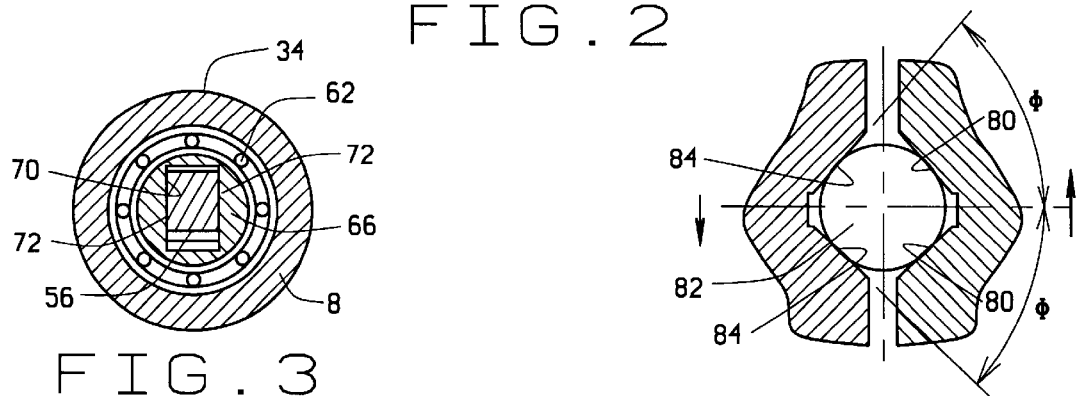
FIG. 3 is a sectional view taken along line 3—3 of FIG. 1.

The tie rods 56 pass through the cavities 38 in the planet rollers 8 and the cavities 44 in the planet rollers 10, there being a separate tie rod 56 for each pair of rollers 8 and 10. Actually, each roller 8 and 10 contains a ball bearing 62 that is fitted around a bushing 66 that is fitted over the tie rod 56. Referring to FIG. 3, the bushing 66 contains a rectangular opening 70. In the region of the two bushings 66, each tie rod 56 has lands 72 that fit within the rectangular opening 70 of the bushings 66 so that the rollers 8, 10 are confined laterally with respect to the axis X. But in this region, the tie rods 56 are somewhat shorter than the openings 70, so that the tie rods 56 do not restrict radial movement and alignment of the rollers 8, 10. The carrier may also contain bridges between the two end disks 50, 54 firmly connecting the disks 50, 54.

Figure 4:
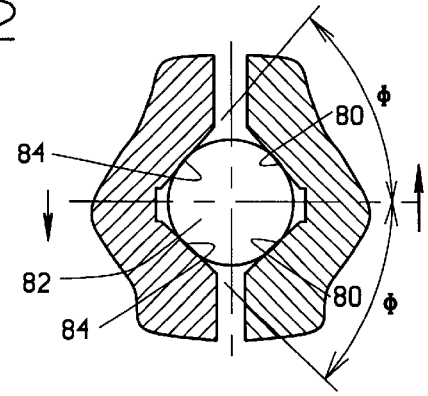
FIG. 4 is a fragmentary sectional view taken along line 4—4 of FIG. 1.

Referring back to FIG. 1, at opposite ends of the housing 14 the traction drive transmission I comprises end plates 76, 78. On the end plates 76, 78 are located roller ramps 80, 90. Roller ramps 84 are also located on the outer ring 4, and roller ramps 94 are located on the outer ring 6. Cylindrical rollers 82 having only a slight arcuate profile are located between the roller ramps 80 and 84 and the roller ramps 90 and 94 and maintained in position by pins 92. Referring to FIG. 4, the ramp roller 82 occupies the space between each pair of ramps 80 and 84. When the transmission I is at rest, the rollers 82 seek a neutral position at the bottoms of their respective ramps 80 and 84. But when the outer ring 4 rotates ever so slightly with respect to the housing 14, the rollers 82 ride up their ramps 80 and 84 and displace the outer ring 4 axially within the housing 14. This seats the planet rollers 8 more tightly between the raceways 22 and 26 of the sun roller 2 and outer ring 4, respectively. To seat the planet rollers 8 tightly enough between the sun roller 2 and the outer ring 4 to prevent excessive slippage between the roller side faces 34 and 35 and the raceways 22 and 26, the following relationship should exist:

$$\tan\phi \geq \frac{\sin\beta_1}{\mu}$$

where

φ is one-half the angle between the ramps 84 on the outer ring and likewise one-half the angle between each the ramps 80 on the end plate 76, and μ is the coefficient of friction at the contact between the side faces 34 and 35 of the rollers 8 and the raceways 22 and 26.

A similar relationship exists between φ, μ and $\beta_2$ for roller ramps 90, 94 at outer ring 6 and end plate 78:

$$\tan\phi \geq \frac{\sin\beta_2}{\mu}.$$

Alternatively, as shown in FIGS. 6–9, the roller ramps 80, 84 and the roller ramps 90, 94 can be removed and replaced with a split sun shaft assembly 120 with a sliding wedge mechanism to create a transmission II. The sun shaft assembly 120 comprises two separate sun roller sections 121, 123 each having tapered raceways 122, 124, respectively. The sun roller sections 121, 123 each define wedge-shaped recesses 126 in opposing faces 130, 132 of the sun roller sections 121, 123. The sun roller sections 121, 123 are fitted onto a center shaft 100. The center shaft 100 comprises wedge-shaped extensions 128 that fit within the wedge-shaped recesses 126 of the sun roller sections 121, 123. However, the extensions 128 are smaller than the recesses 126 (FIG. 9) in that a small amount of relative rotation is allowed between the center shaft 100 and the sun roller sections 121, 123, and therefore between the recesses and the extensions 128.

When installed within the transmission II, the torque is applied from the extensions 128 of the center shaft 100 to the recesses 126 of the sun roller sections 121, 123 some relative rotation occurs between the center shaft 100 and the sun roller sections 121, 123. Because the recesses 126 and the extensions 128 are wedge-shaped, the relative rotation causes axial movement of the sun roller section 121 away from the sun roller section 123. This seats the planet rollers 8 more tightly between the raceway 122 of the sun roller section 121 and the raceway 26 of the outer ring 4 and seats the planet rollers 10 more tightly between the raceway 124 of the sun roller section 123 and the raceway 30 of the outer ring 6, thereby eliminating the need for ramp rollers.

Figure 5:
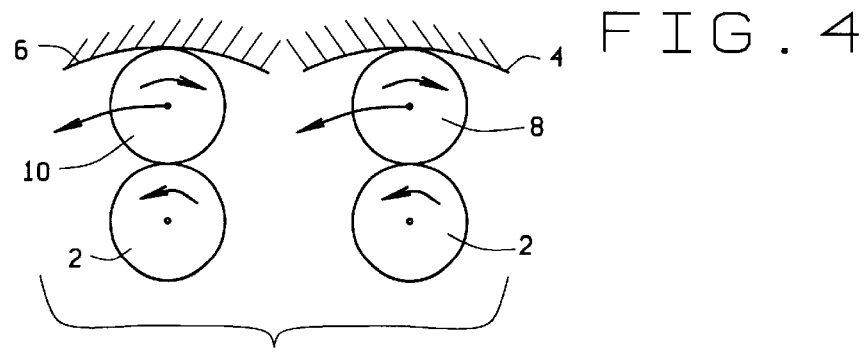
FIG. 5 is a schematic view illustrating the kinematics of the transmission.
Figure 6:
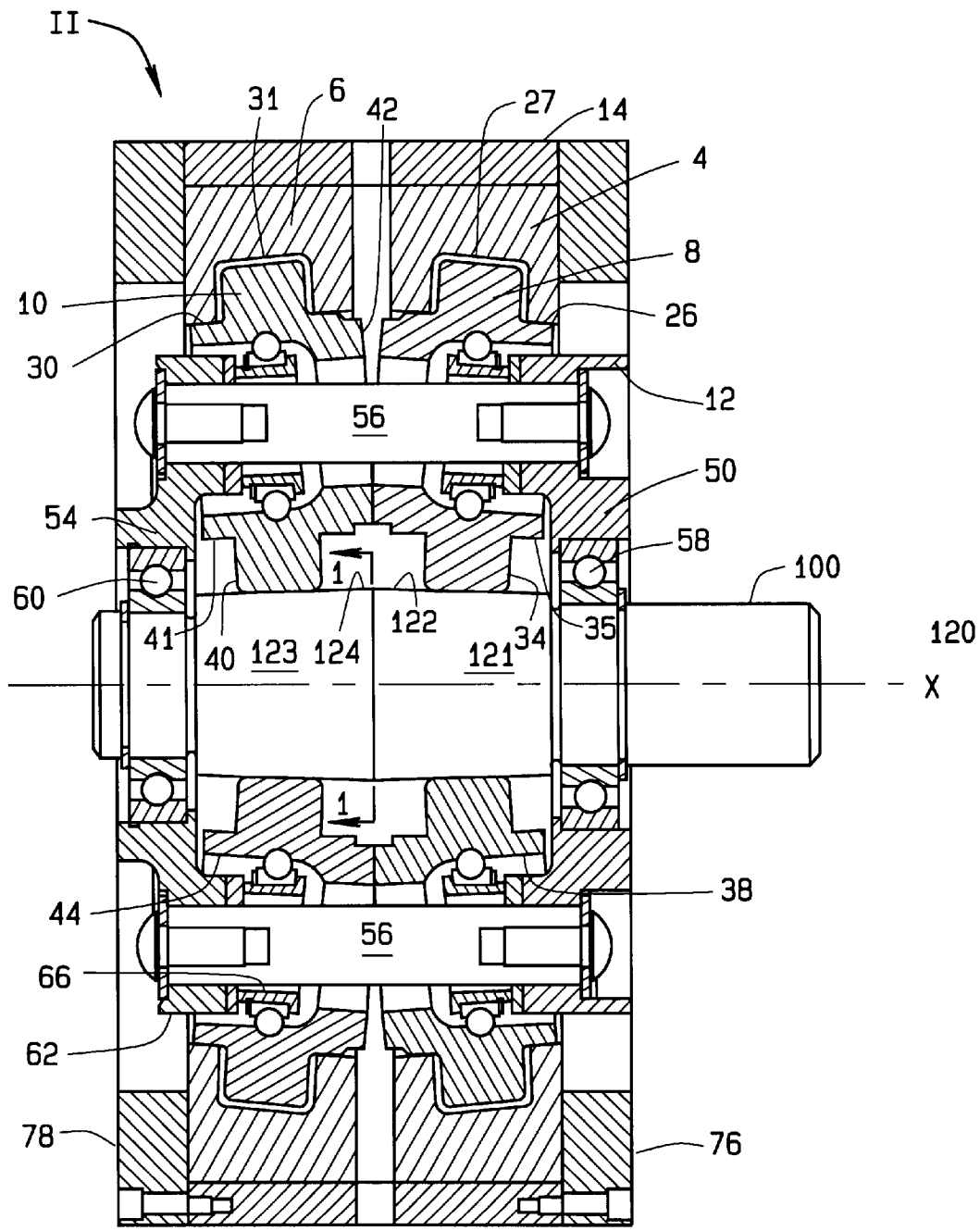
FIG. 6 is a longitudinal sectional view of another embodiment of the transmission.
Figure 7:
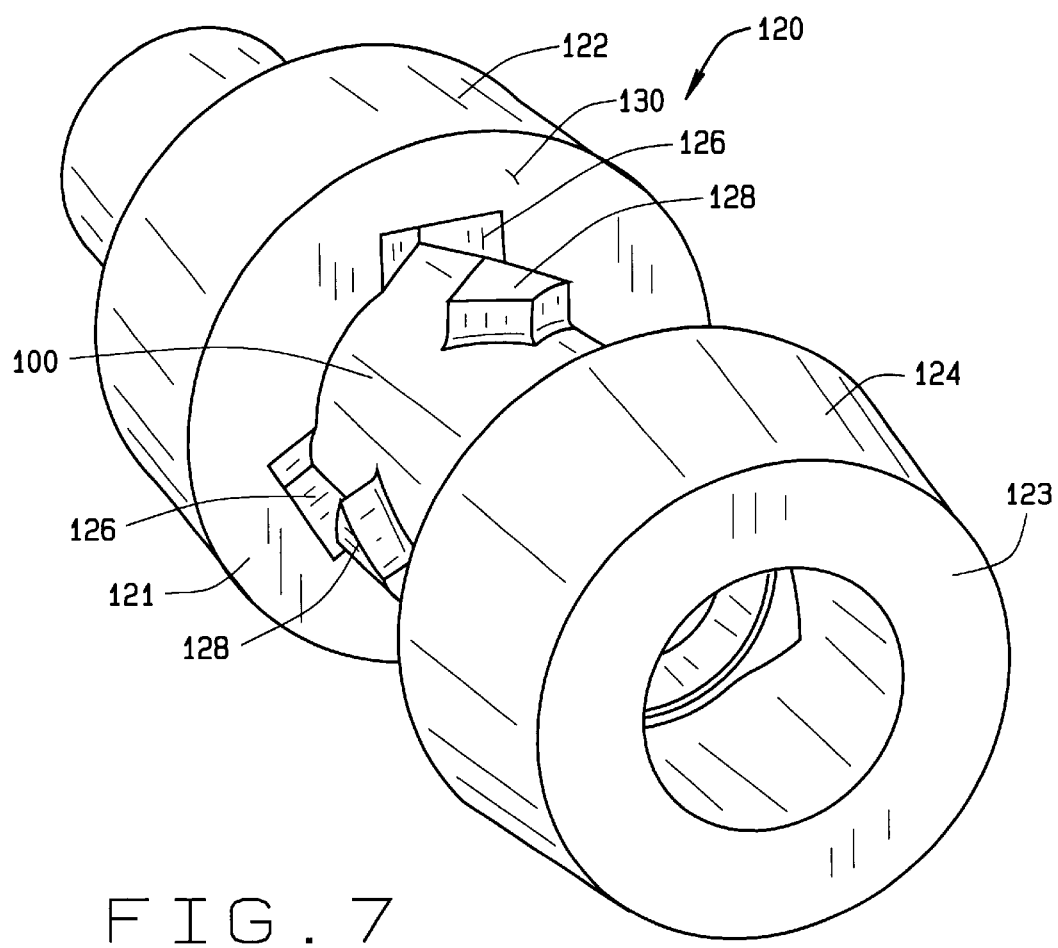
FIG. 7 is a perspective view of a split sun shaft of the embodiment of FIG. 6.
Figure 9:
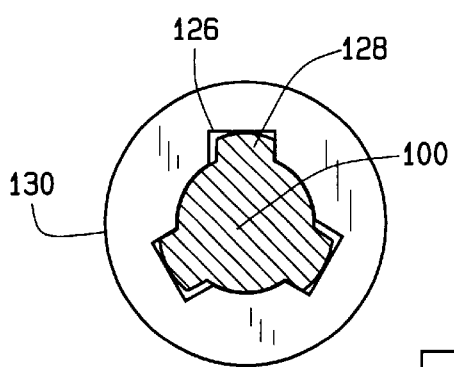
FIG. 9 is a sectional view taken along line 1—1 of FIG. 6.
Figure 8:
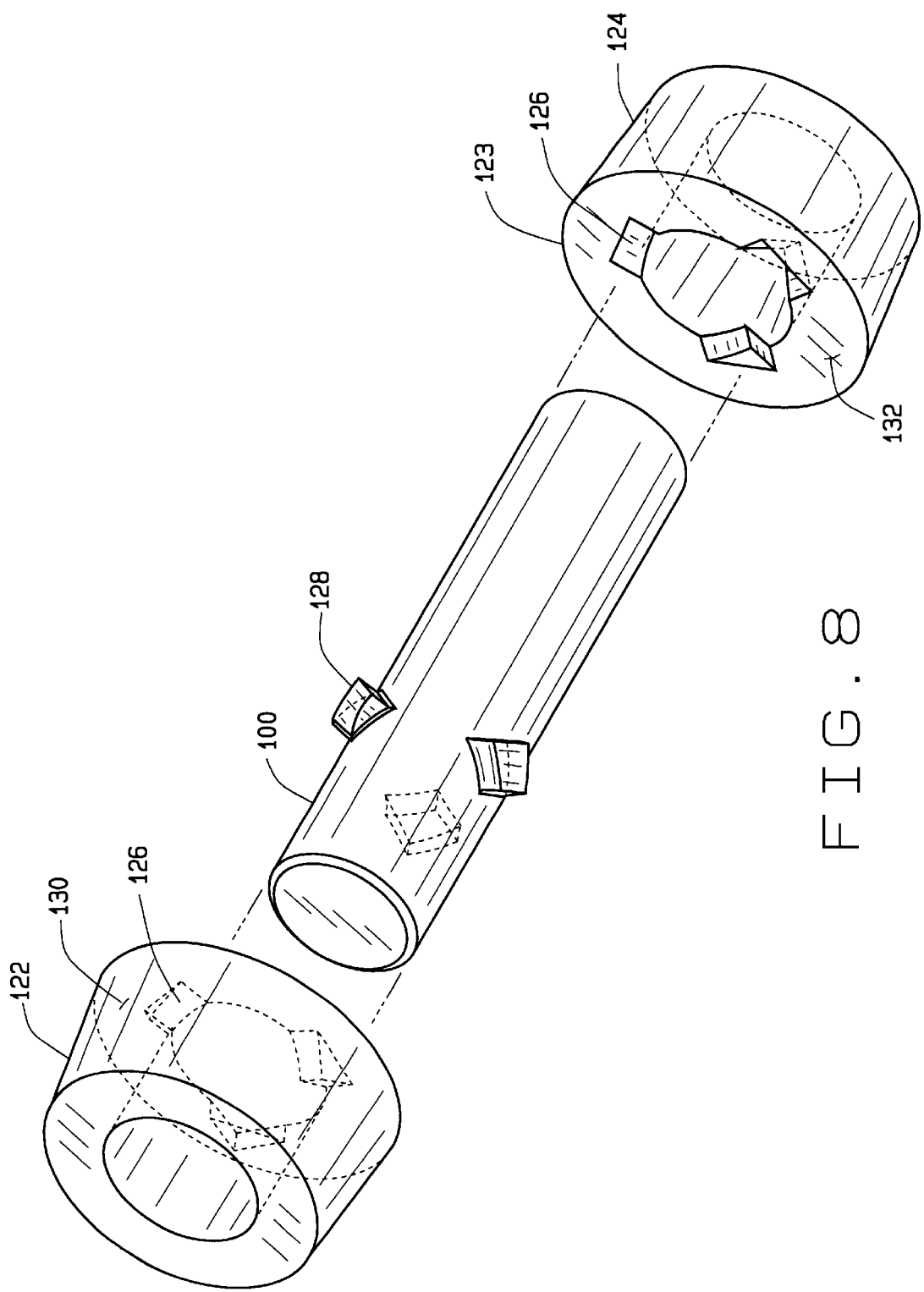
FIG. 8 is an exploded, transparent perspective view of a split sun shaft of the embodiment of FIG. 6.

The transmission I has the capacity to transfer torque and power in several ways. Power may be applied to the transmission at the center shaft 20, at the first or second end disks 50, 54 of the planet carrier 12, or to the housing 14 and likewise power may be delivered at any one or two of the remaining components. One of the remaining components should be held stationary or set to a prescribed rotation. In a typical application shown in FIG. 5, the housing 14 (and therefore the outer rings 4, 6) remains stationary, while torque is applied to center shaft 20 on which the sun roller 2 rotates, causing the planet rollers 8 to roll along the raceway 22 of the sun roller 2 and along the raceway 26 of the outer ring 4 which remains stationary within the housing 14. Therefore, the planet rollers 8 revolve about the sun roller 2 and bring the carrier 12 along with it. The carrier 12 thus rotates about the axis X and turns the end disk 50 or 54 from which power is delivered. As the rollers 8 orbit the sun roller 2, they displace the outer ring 4 circumferentially in the housing 14 and this causes the ramp rollers 82 to move up the ramps 84 on the outer ring 4 and the ramps 80 on the end plate 76. Therefore, the outer ring 4 moves axially slightly and the rollers 8 seat more firmly against the raceways 22 and 26 of the roller 2 and ring 4, respectively. By the same token, the rollers 10, as they orbit the sun roller 2, displace the outer ring 6 slightly with respect to the end plate 78. The rollers 82 move up the ramps 90 and 94 and urge the outer ring 6 toward the outer ring 4. The planet rollers 10 therefore seat more firmly against the raceways 24 and 30 of the sun roller 2 and ring 6, respectively.

The speed ratio $K_{2-14}$ between the sun roller 2 and the housing 14 with respect to carrier 12 may be calculated $$K_{2-14} = \frac{\sin\beta_1}{\sin\alpha_1}\sin\frac{\gamma_1}{\sin\delta_1} = \frac{\sin\beta_2}{\sin\alpha_2}\sin\frac{\gamma_2}{\sin\delta_2},$$

where $\beta_1 = \alpha_1 + \delta_1 + \gamma_1$ and $\beta_2 = \alpha_2 + \delta_2\gamma_2$.

Prior art transmissions, such as that disclosed in U.S. Pat. No. 6,095,940, had a speed ratio of $$K = \frac{\sin\beta_1}{\sin\alpha_1} = \frac{\sin\beta_2}{\sin\alpha_2}.$$

Therefore, one can see that the speed ratio is modified by a factor of $$\frac{\sin\gamma_1}{\sin\delta_1} \text{ or } \frac{\sin\gamma_2}{\sin\delta_2}.$$

Thus, for a constant $\beta_i$ and $\alpha_i$, one can noticeably modify the speed ratio of the traction drive by partitioning $\gamma_i$ and $\delta_i$, where i=1 or 2. Also, by partitioning a contact length, $L_2$ (FIG. 2), between the sun roller 2 and the planetary rollers 8, 10 and the contacts lengths, $L_1$ and $L_3$, between the outer rings 4, 6 and the rollers 8, 10, a balance in the contact strength can be achieved.

The result of the above invention is a traction drive transmission wherein pure rolling contact exists between a. the first inner raceway 22 and the first rollers 8 b. the first outer raceway 26 and the first rollers 8 c. the second inner raceway 24 and the second rollers 10 d. the second outer raceway 30 and the second rollers 10 e. the first and second rollers 8, 10 of each pair.

What is claimed is:

1. A traction drive transmission organized about a center axis comprising:

a sun roller having first and second inner raceways, the raceways being tapered such that their large ends are presented toward each other;

first and second outer raceways tapered such that their large ends are presented toward each other, the first outer raceway being located around the first inner raceway and the second outer raceway being located around the second inner raceway;

a first plurality of planet rollers arranged in a row between the first inner raceway and the first outer raceway and having a first tapered side face that contacts the first inner raceway and a second tapered side face that contacts the first outer raceway;

a second plurality of planet rollers arranged in a row between the second inner raceway and the second outer raceway and having a first tapered side face that contacts the second inner raceway and a second tapered side face that contacts the second outer raceway; the first and second planet rollers being arranged in pairs, with the first planet roller of any pair directly backing and directly serving to axially position the second planet roller of the pair; and a carrier connected to the first and second planet rollers.

2. The traction drive transmission of claim 1 wherein the first and second outer raceways have reliefs formed therein.

3. The traction drive transmission of claim 1 wherein pure rolling contact characterized by the absence of spinning exists between:

a. the first inner raceway and the first rollers;
b. the first outer raceway and the first rollers;
c. the second inner raceway and the second rollers;
d. the second outer raceway and the second rollers; and
e. the first and second rollers of each pair.

4. The traction drive transmission of claim 1 wherein
a. the first inner raceway lies in a conical envelope having its apex at a first point along the center axis;
b. the first outer raceway lies in a conical envelope having its apex at the first point on the center axis;
c. the second inner raceway lies in a conical envelope having its apex at a second point along the center axis; and
d. the second outer raceway lies in a conical envelope having its apex at the second point along the center axis.

5. The traction drive transmission of claim 4 wherein
a. the first side faces of the first rollers lie in conical envelopes having their apices at the first point along the center axis;
b. the second side faces of the first rollers lie in conical envelopes having their apices at the first point along the center axis;
c. the first side faces of the second rollers lie in conical envelopes having their apices at the second point along the center axis;
d. the second side faces of the second rollers lie in conical envelopes having their apices at the second point along the center axis;
e. the first rollers revolve about first axes that intersect the center axis at the first point;
f. the second rollers revolve about second axes that intersect the center axis at the second point; and
g. the first and second axes for the first and second rollers for any pair of first and second rollers intersect at a third point.

6. The traction drive transmission of claim 5 wherein
a. the envelopes of the first and second inner raceways intersect at a fourth point;
b. the envelopes of the first and second outer raceways intersect at a fifth point;
c. the first and second rollers of each pair have end faces that contact each other; and
d. the end faces of each pair of first and second rollers contact each other along a straight line connecting the third, the fourth and the fifth points.

7. A fraction drive transmission organized about a center axis comprising:

a sun roller having first and second inner raceways, the raceways being tapered such that their large ends are presented toward each other;

first and second outer raceways tapered such that their large ends are presented toward each other, the first outer raceway being located around the first inner raceway and the second outer raceway being located around the second inner raceway;

a first plurality of planet rollers arranged in a row between the first inner raceway and the first outer raceway and having a first tapered side face that contacts the first inner raceway and a second tapered side face that contacts the first outer raceway;

a second plurality of planet rollers arranged in a row between the second inner raceway and the second outer raceway and having a first tapered side face that contacts the second inner raceway and a second tapered side face that contacts the second outer raceway; the first and second planet rollers being arranged in pairs, with the first planet roller of any pair backing and serving to axially position the second planet roller of the pair;

a carrier connected to the first and second planet rollers; and first and second end plates adjacent first and second outer rings, respectively, wherein at least one end plate and at least one of the outer rings have opposed ramps; and further comprising rolling elements located between the ramps of the end plate and the outer ring, the ramps being oriented such that the rolling elements move up them and urge the one outer ring axially toward the other outer ring when relative rotation occurs between the one ring and the end plate.

8. A traction drive transmission organized about a center axis comprising:

a sun roller having first and second inner raceways, the raceways being tapered such that their large ends are presented toward each other;

first and second outer raceways tapered such that their large ends are presented toward each other, the first outer raceway being located around the first inner raceway and the second outer raceway being located around the second inner raceway;

a first plurality of planet rollers arranged in a row between the first inner raceway and the first outer raceway and having a first tapered side face that contacts the first inner raceway and a second tapered side face that contacts the first outer raceway;

a second plurality of planet rollers arranged in a row between the second inner raceway and the second outer raceway and having a first tapered side face that contacts the second inner raceway and a second tapered side face that contacts the second outer raceway; the first and second planet rollers being arranged in pairs, with the first planet roller of any pair backing and serving to axially position the second planet roller of the pair;

a carrier connected to the first and second planet rollers; and wherein the sun roller comprises first and second sun roller sections having opposing ends wherein each sun roller section defines wedge-shaped recesses on its opposing end, each sun roller section having a central bore therethrough; the sun roller further comprising a center shaft comprising wedge-shaped extensions which fit within the wedge-shaped recesses of the first and second sun roller sections.

9. A traction drive transmission organized about a center axis comprising:
a sun roller having a first raceway section defining a first inner raceway and a second raceway section defining a second inner raceway, the raceways being tapered such that their large ends are presented toward each other; the first and second raceway sections having opposed ends, the first and second raceway sections comprising wedge-shaped recesses upon their opposed ends and center bores therethrough the first and second raceway sections disposed about a center shaft through their center bores, the center shaft defining wedge-shaped extensions, the wedge-shaped extensions located to fit within the wedge-shaped recesses of the first and second raceway sections;
first and second outer raceways tapered such that their large ends are presented toward each other, the first outer raceway being located around the first inner raceway and the second outer raceway being located around the second inner raceway;
a first plurality of planet rollers arranged in a row between the first inner raceway and the first outer raceway and having a first tapered side face that contacts the first inner raceway and a second tapered side face that contacts the first outer raceway;
a second plurality of planet rollers arranged in a row between the second inner raceway and the second outer raceway and having a first tapered side face that contacts the second inner raceway and a second tapered side face that contacts the second outer raceway; the first and second planet rollers being arranged in pairs, with the first planet roller of any pair backing and serving to axially position the second planet roller of the pair; and
a carrier connected to the first and second planet rollers.

10. The fraction drive transmission of claim 9 wherein the first and second outer raceways have reliefs formed therein.

11. The fraction drive transmission of claim 9 wherein pure rolling contact characterized by the absence of spinning exists between:
a. the first inner raceway and the first rollers;
b. the first outer raceway and the first rollers;
e. the second inner raceway and the second rollers;
d. the second outer raceway and the second rollers; and
e. the first and second rollers of each pair.

12. The traction drive transmission of claim 9 wherein
a. the first inner raceway lies in a conical envelope having its apex at a first point along the center axis;
b. the first outer raceway lies in a conical envelope having its apex at the first point on the center axis;
c. the second inner raceway lies in a conical envelope having its apex at a second point along the center axis; and
d. the second outer raceway lies in a conical envelope having its apex at the second point along the center axis.

13. The traction drive transmission of claim 12 wherein
a. the first side faces of the first rollers lie in conical envelopes having their apices at the first point along the center axis;
b. the second side faces of the first rollers lie in conical envelopes having their apices at the first point along the center axis;
c. the first side faces of the second rollers lie in conical envelopes having their apices at the second point along the center axis;
d. the second side faces of the second rollers lie in conical envelopes having their apices at the second point along the center axis;
a. the first rollers revolve about first axes that intersect the center axis at the first point;
f. the second rollers revolve about second axes that intersect the center axis at the second point; and
g. the first and second axes for the first and second rollers for any pair of first and second rollers intersect at a third point.

14. The traction drive transmission of claim 13 wherein
a. the envelopes of the first and second inner raceways intersect at a fourth point;
b. the envelope of the first and second outer raceways intersect at a fifth point;
c. the first and second rollers of each pair have end faces that contact each other; and
d. the end faces of each pair of first and second rollers contact each other along a straight line connecting the third, fourth and fifth points.

15. A traction drive transmission organized about a center axis comprising:
a sun roller having first and second inner raceways, the raceways being tapered such that their large ends are presented toward each other;
first and second outer raceways tapered such that their large ends are presented toward each other, the first outer raceway being located around the first inner raceway and the second outer raceway being located around the second inner raceway;
a first plurality of planet rollers arranged in a row between the first inner raceway and the first outer raceway and having a first tapered side face that contacts the first inner raceway and a second tapered side face that contacts the first outer raceway;
a second plurality of planet rollers arranged in a row between the second inner raceway and the second outer raceway and having a first tapered side face that contacts the second inner raceway and a second tapered side face that contacts the second outer raceway; the first and second planet rollers being arranged in pairs, with the first planet roller of any pair backing and serving to axially position the second planet roller of the pair;
a carrier connected to the first and second planet rollers;
an end plate adjacent to one of the outer rings wherein the end plate and at least one of the outer rings have opposed ramps; and
rolling elements located between the ramps of the end plate and the outer ring, the ramps being oriented such that the rolling elements move up them and urge the one outer ring axially toward the other outer ring when relative rotation occurs between the one ring and the end plate.

16. The traction drive transmission of claim 15 wherein the rolling elements comprise round rollers.

17. The traction drive transmission of claim 16 wherein the rollers are maintained between the ramps by pins.

18. The traction drive transmission of claim 17 wherein pure rolling contact characterized by the absence of spinning exists between:
a. the first inner raceway and the first rollers;
b. the first outer raceway and the first rollers;

c. the second inner raceway and the second rollers;
d. the second outer raceway and the second rollers; and
e. the first and second rollers of each pair.

19. The traction drive transmission of claim 18 wherein
   a. the first inner raceway lies in a conical envelope having its apex at a first point along the center axis;
   b. the first outer raceway lies in a conical envelope having its apex at the first point on the center axis;
   c. the second inner raceway lies in a conical envelope having its apex at a second point along the center axis; and
   d. the second outer raceway lies in a conical envelope having its apex at the second point along the center axis.

20. The traction drive transmission of claim 19 wherein
   a. the first side faces of the first rollers lie in conical envelopes having their apices at the first point along the center axis;
   b. the second side faces of the first rollers lie in conical envelopes having their apices at the first point along the center axis;
   c. the first side faces of the second rollers lie in conical envelopes having their apices at the second point along the center axis;
   d. the second side faces of the second rollers lie in conical envelopes having their apices at the second point along the center axis;
   e. the first rollers revolve about first axes that intersect the center axis at the first point;
   f. the second rollers revolve about second axes that intersect the center axis at the second point; and
   g. the first and second axes for the first and second rollers for any pair of first and second rollers intersect at a third point.

21. The traction drive transmission of claim 20 wherein:
   a. the envelopes of the first and second inner raceways intersect at a fourth point;
   b. the envelopes of the first and second outer raceways intersect at a fifth point; and
   c. the first and second roller of each pair have end faces that contact each other along a straight line connecting the third, fourth and fifth points.

* * * * *

UNITED STATES PATENT AND TRADEMARK OFFICE
CERTIFICATE OF CORRECTION

PATENT NO. : 6,689,008 B2
DATED : February 10, 2004
INVENTOR(S) : Xiaolan Ai

It is certified that error appears in the above-identified patent and that said Letters Patent is hereby corrected as shown below:

Column 6,
Line 15, replace $"K_{2-14} = \frac{\sin \beta_1}{\sin \alpha_1} \sin \frac{\gamma_1}{\sin \delta_1} = \frac{\sin \beta_2}{\sin \alpha_2} \sin \frac{\gamma_2}{\sin \delta_2},"$ with
$-- K_{2-14} = \frac{\sin \beta_1}{\sin \alpha_1} \frac{\sin \gamma_1}{\sin \delta_1} = \frac{\sin \beta_2}{\sin \alpha_2} \frac{\sin \gamma_2}{\sin \delta_2}, --$ Line 20, replace $"\beta_2 = \alpha_2 + \delta_2 \gamma_2"$ with $-- \beta_2 = \alpha_2 + \delta_2 + \gamma_2 --$ Column 7,
Line 63, replace "fraction" with -- traction --

Column 9,
Line 36 and 38, replace "fraction" with -- traction --
Line 43, replace "e." with -- c. --

Column 10,
Line 4, replace "a." with -- e. --

Signed and Sealed this

Sixth Day of April, 2004

JON W. DUDAS
*Acting Director of the United States Patent and Trademark Office*